United States Patent
Gronke

(10) Patent No.: US 6,888,792 B2
(45) Date of Patent: May 3, 2005

(54) TECHNIQUE TO PROVIDE AUTOMATIC FAILOVER FOR CHANNEL-BASED COMMUNICATIONS

(75) Inventor: Edward P. Gronke, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 818 days.

(21) Appl. No.: 09/730,579

(22) Filed: Dec. 7, 2000

(65) Prior Publication Data

US 2002/0071386 A1 Jun. 13, 2002

(51) Int. Cl.[7] .................................................. H04J 3/14
(52) U.S. Cl. ...................... 370/227; 370/228; 709/239; 714/3
(58) Field of Search ................................ 370/216–228; 709/239; 714/1–4

(56) References Cited

U.S. PATENT DOCUMENTS

| | | | | |
|---|---|---|---|---|
| 6,032,194 A | * | 2/2000 | Gai et al. .................... | 709/239 |
| 6,208,644 B1 | * | 3/2001 | Pannell et al. .............. | 370/389 |
| 6,298,061 B1 | * | 10/2001 | Chin et al. ................... | 370/400 |
| 6,308,281 B1 | * | 10/2001 | Hall et al. ....................... | 714/4 |
| 6,311,288 B1 | * | 10/2001 | Heeren et al. .................. | 714/4 |
| 6,360,281 B1 | * | 3/2002 | Feagans .......................... | 710/1 |
| 6,366,558 B1 | * | 4/2002 | Howes et al. ............... | 370/219 |
| 6,385,197 B1 | * | 5/2002 | Sugihara ..................... | 370/380 |
| 6,392,989 B1 | * | 5/2002 | Jardetzky et al. ........... | 370/216 |
| 6,411,599 B1 | * | 6/2002 | Blanc et al. ................. | 370/219 |
| 6,570,881 B1 | * | 5/2003 | Wils et al. ................... | 370/410 |
| 6,621,788 B1 | * | 9/2003 | Terasaki ...................... | 370/220 |
| 6,629,166 B1 | * | 9/2003 | Grun ........................... | 710/36 |
| 6,678,241 B1 | * | 1/2004 | Gai et al. .................... | 370/216 |

OTHER PUBLICATIONS

Dunning et al., "The Virtual Interface Architecture", IEEE Micro, pp. 66–76, Mar.–Apr., 1998, vol. 18, Issue 2.
"Virtual Interface Architecture Specification", Revision 0.94.d, Sep. 25, 1997, pp. 1–79.

* cited by examiner

Primary Examiner—Min Jung
(74) Attorney, Agent, or Firm—Kacvinksky LLC

(57) ABSTRACT

Embodiments are described to provide automatic failover in a channel-based network. According to an example embodiment, a virtual port to physical port mapper is provided.

33 Claims, 10 Drawing Sheets

VI ARCHITECTURAL MODEL

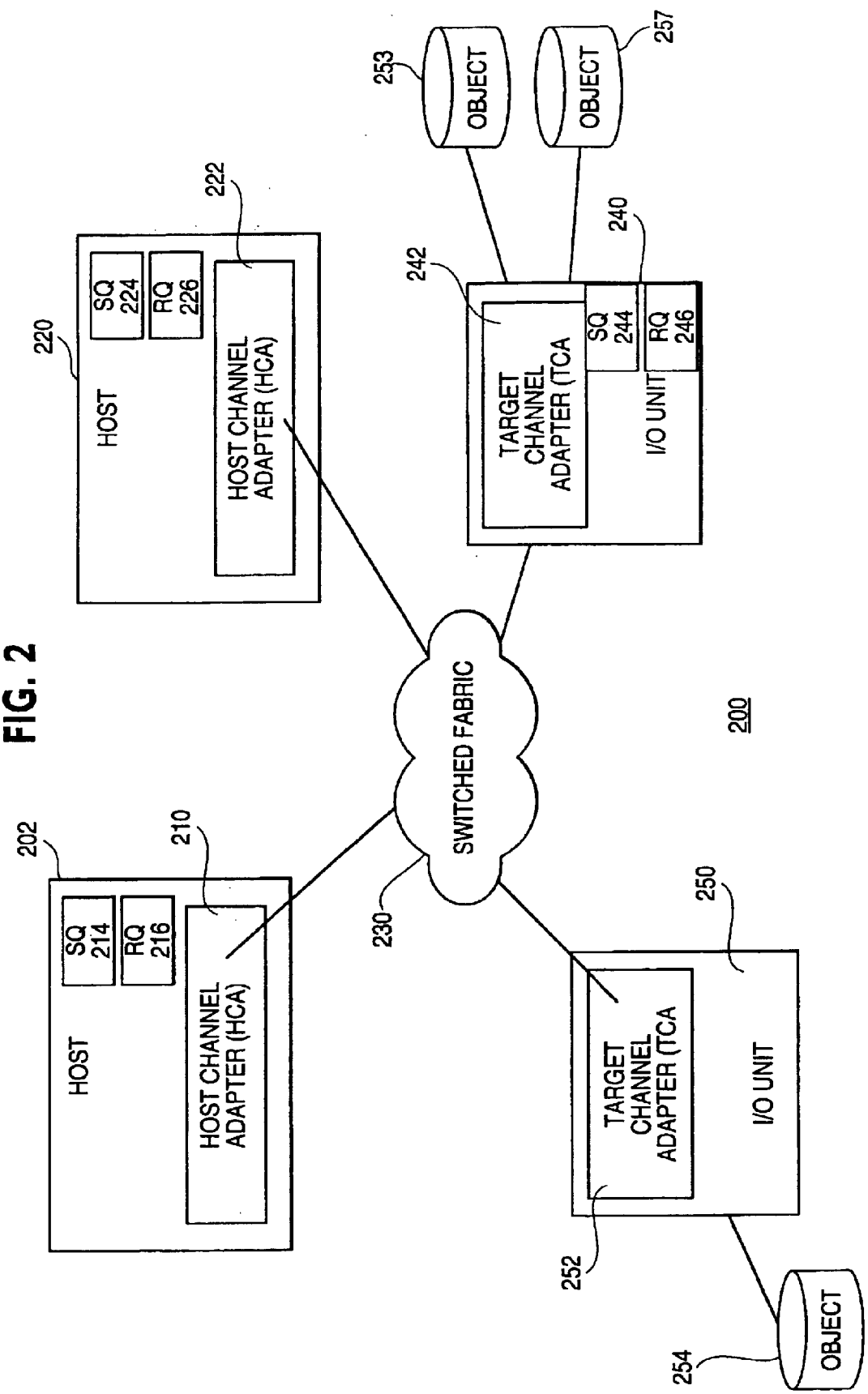

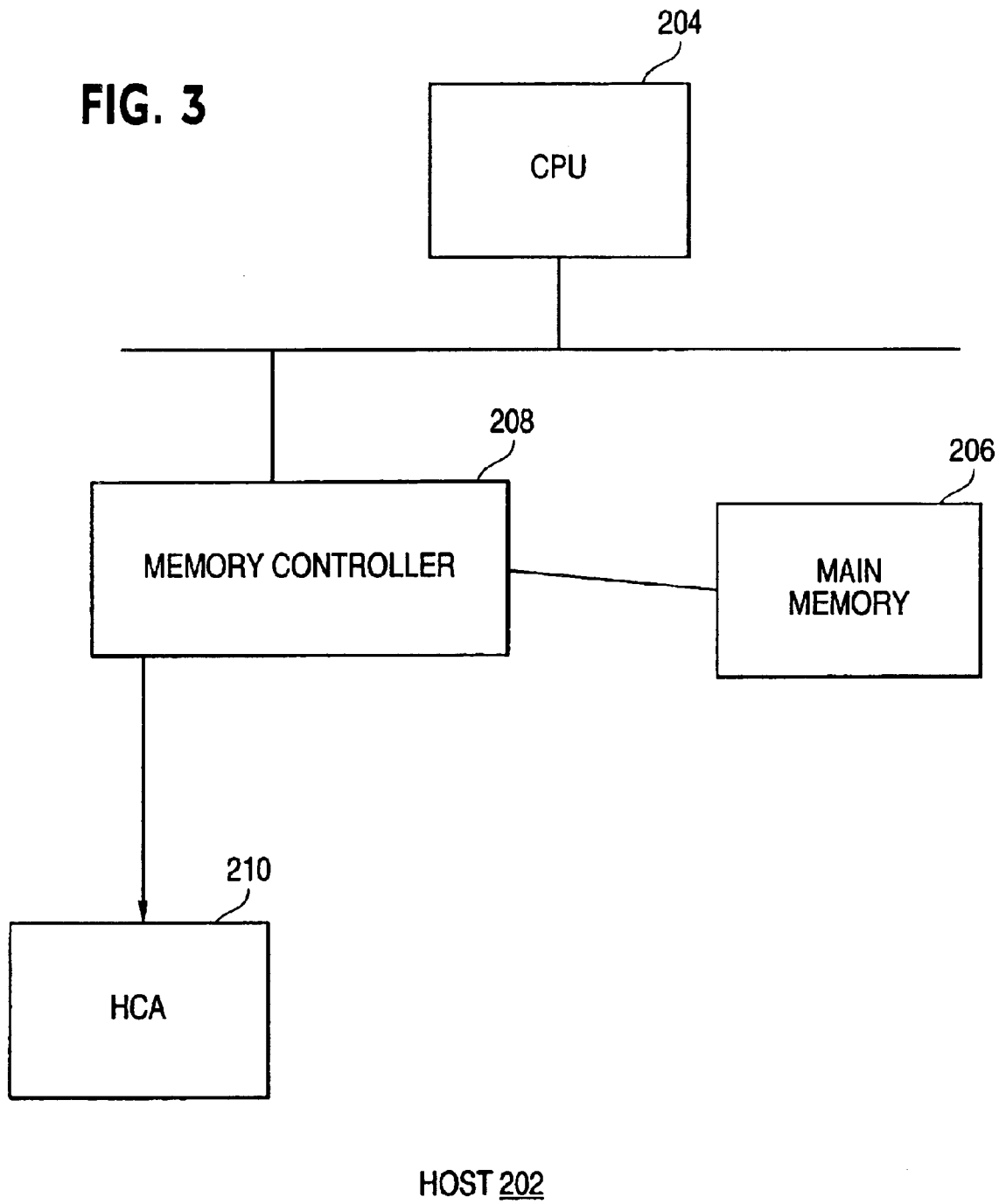

FIG. 7

VIRTUAL-TO-PHYSICAL PORT MAP

| VIRTUAL PORT | PHYSICAL PORT |
|---|---|
| VP1 | PP6 |
| VP2 | PP1 |
| VP3 | PP7 |
| VP4 | PP4 |
| VP5 | PP2 |
| VP6 | PP3 |
| VPN | PPN |

700

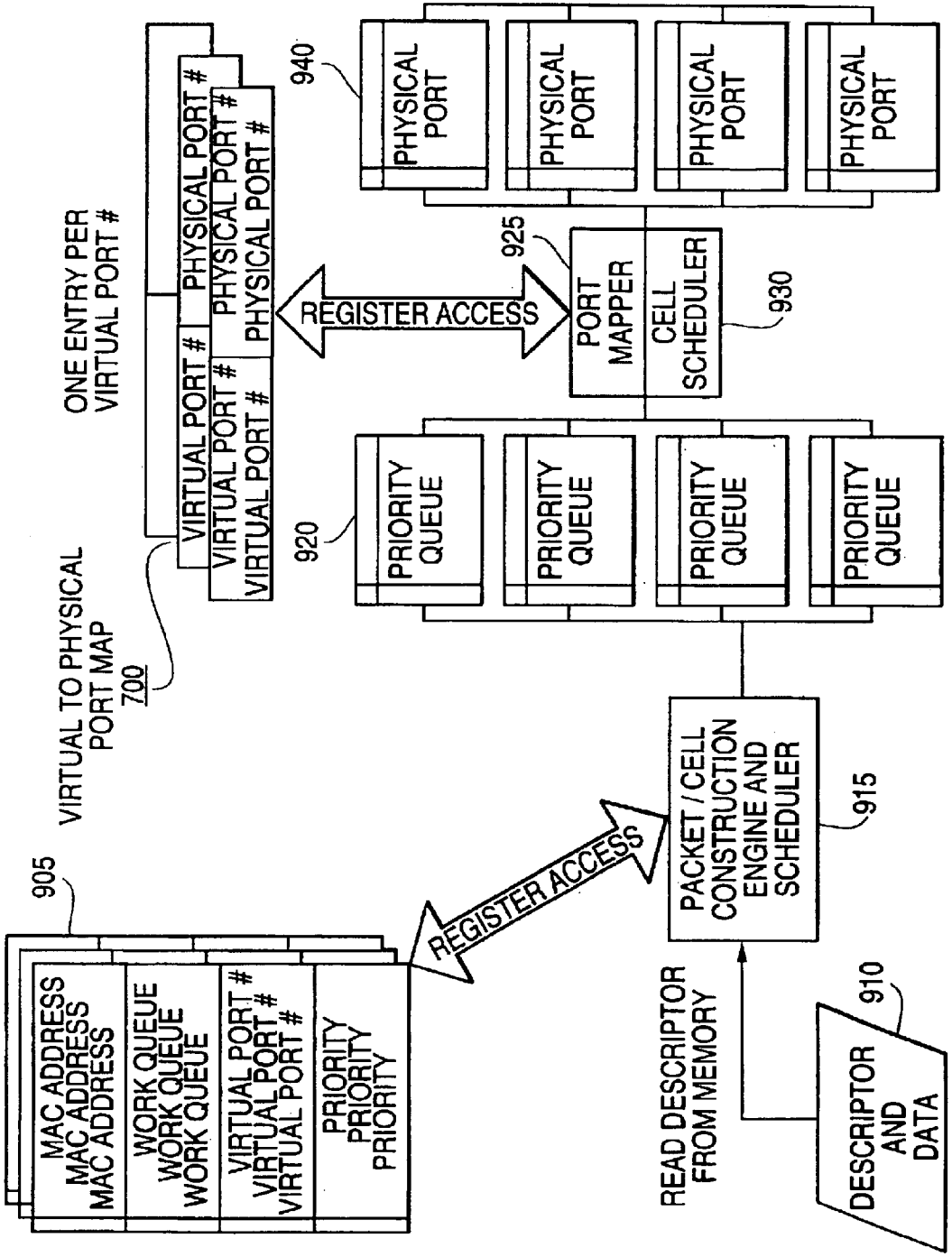

TECHNIQUE TO PROVIDE AUTOMATIC FAILOVER FOR CHANNEL-BASED COMMUNICATIONS

FIELD

The invention generally relates to computers and computer networks and in particular to providing failover for channel based communications.

BACKGROUND

A computer network or fabric typically includes one or more switches or routers coupled together via one or more communication links. In some instances, to allow a fault tolerant operation, where a network can continue operating in the event of a fault or failure, multiple or parallel fabrics or networks can be coupled between nodes. Thus, in the event of failure of a switch or node in a fabric or of the entire fabric itself, it is desirable to provide an alternate path or an alternate fabric to allow communication between two end points to continue. Providing an alternate path or alternate mechanism that may be used in the event of failure or fault may be referred to as a failover technique. Unfortunately, providing a failover capability is typically a complicated process. There is a need to provide a simpler and more effective failover technique.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and is not limited thereto. The spirit and scope of the present invention is limited only by the terms of the appended claims.

The following represents brief descriptions of the drawings, wherein:

FIG. 2 is a block diagram illustrating an example channel based network according to an example embodiment.

FIG. 3 is A block diagram illustrating a block diagram illustrating a hardware configuration of an host according to an example embodiment.

FIG. 7 is a diagram illustrating a virtual to physical port map according to an example embodiment.

FIG. 9 is a block diagram of a node according to an example embodiment.

DETAILED DESCRIPTION

I. Introduction

A channel based network, which may be based upon the VI architecture, for example, is provided that allows one or more nodes, such as hosts to communicate with one or more remote fabric attached nodes, such as hosts or I/O units, over a switched fabric. A node includes a plurality of physical ports, and is connected to a plurality of fabrics. A channel or connection is established between a node and a remote node over a first fabric. According to an example embodiment, the per channel context, which describes the channel, includes the address of the remote node, the work queue pair number of the remote node and the local virtual port number. A virtual to physical port map is provided to map each virtual port to a physical port. If a fabric failure is detected, the node identifies an alternate or new fabric and identifies a new physical port connected to the new fabric for each channel. The node then reprograms the virtual to physical port map to assign the new physical ports to the virtual ports, to effect a failover onto the new fabric. Thus, by using a virtual to physical port map, failover onto a new fabric can be performed without establishing new channels or connections since the per channel context remains the same, while reducing kernel processing and overhead.

II. The VI Architecture

One technology supporting an example embodiment the invention is the Virtual Interface (VI) Architecture. Several legacy transports have been used as standards for many years. The centralized in-kernel protocol processing for data transfers performed by legacy transports, such as the Transmission Control Protocol/Internet Protocol (TCP/IP) prohibits applications from realizing the potential raw hardware performance offered by underlying high-speed networks. The VI Architecture is proposed as an interface between high performance network hardware and computer systems, and is described in Virtual Interface (VI) Architecture Specification, Version 1.0, Dec. 16, 1997, jointly authored by Compaq Corp., Intel Corp. and Microsoft Corp. The VI Architecture was designed to eliminate the buffer copies and kernel overhead for communications associated with such legacy transports that have caused traditional networked applications to be performance bottlenecks in the past.

Figure 1A:
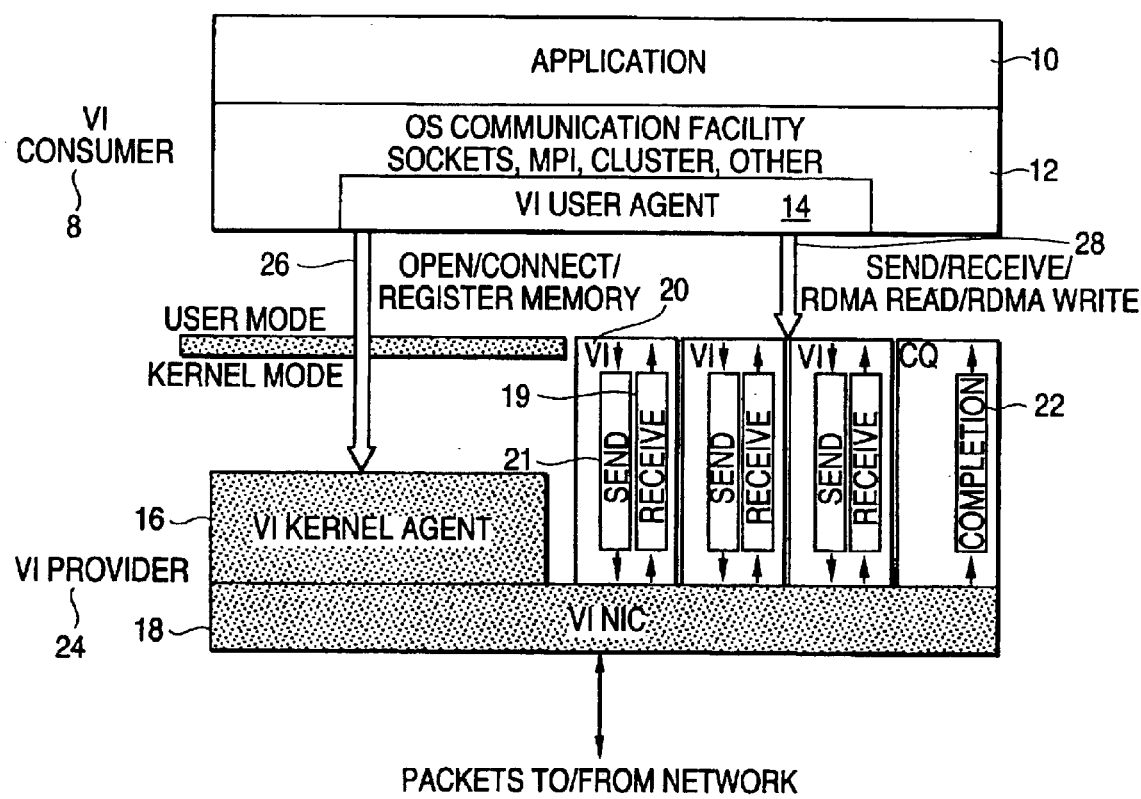
FIG. 1A is a block diagram illustrating a Virtual Interface (VI) architectural model.

FIG. 1A is a block diagram illustrating the VI Architectural model. The VI architecture is a user-level networking architecture designed to achieve low latency, high bandwidth communication within a cluster. VI architecture avoids intermediate data copies and bypasses the operating system to achieve low latency, high bandwidth data transfers.

As shown in FIG. 1A, the VI architectural model includes a VI consumer 8 and a VI provider 24. A VI consumer 8 is a software process that communicates using a Virtual Interface (VI). The VI consumer 8 typically includes an application program 10, an operating system communications facility 12 such as Sockets and a VI user agent 14. The VI provider 24 includes the combination of a VI network interface controller (VI NIC) 18 and a VI kernel agent 16.

Figure 1B:
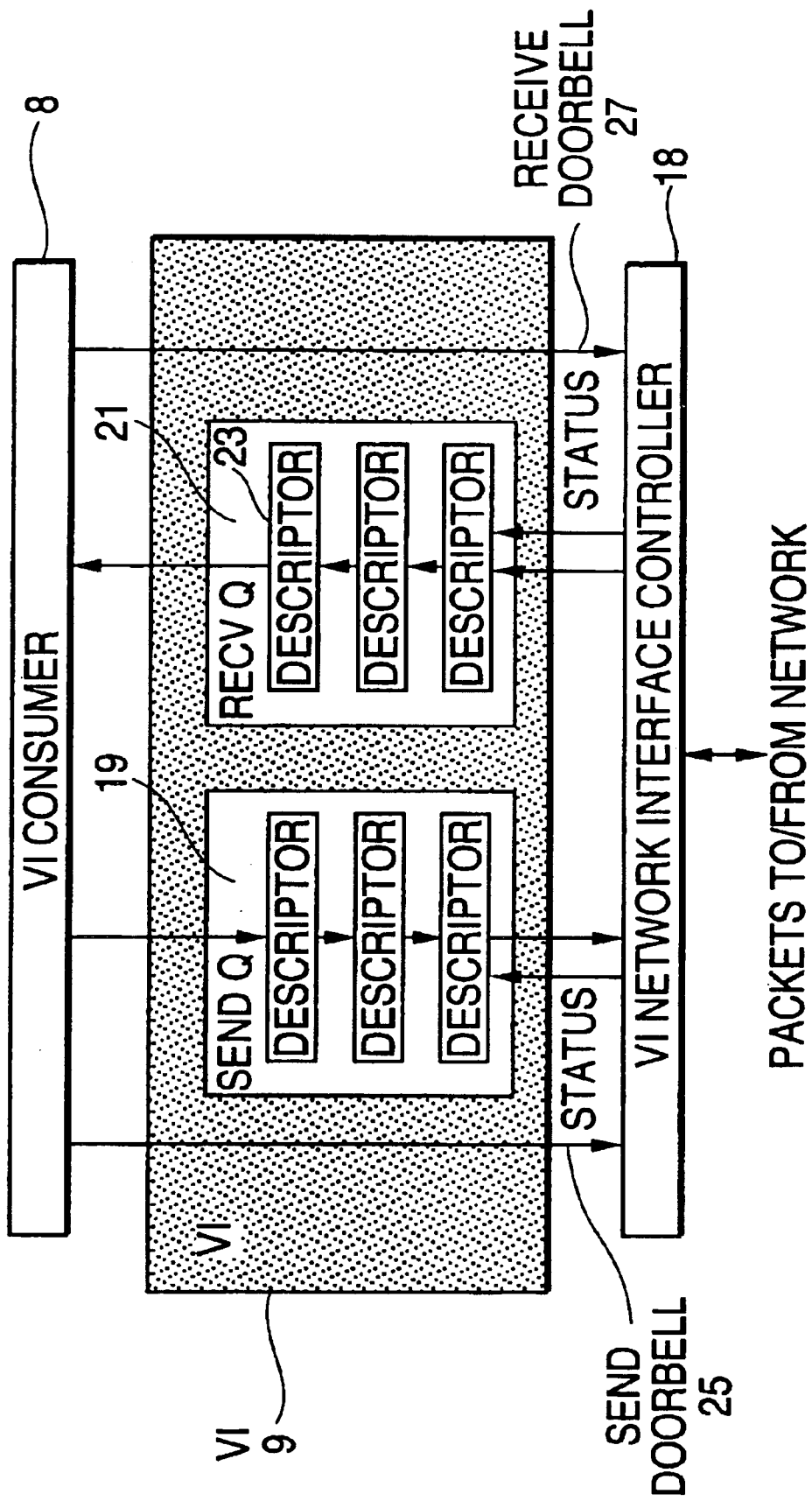
FIG. 1B is a block diagram illustrating a Virtual Interface.

A block diagram illustrating a virtual interface (VI) is illustrated in FIG. 1B. Referring to FIGS. 1A and 1B, a virtual interface (VI) 9 is an interface between a VI NIC 18 and a process or application (a VI consumer 8). The VI 9 allows a VI NIC 18 to directly access the process' (or application's) memory for data transfer operations between the application and the network, for example transfers data directly between the application memory and the network without passing through the operating system. The VI 9 includes a pair of work queues, one for send operations (a send queue 21) and one for receive operations (receive queue 19). The work queues store one or more descriptors 23 between the time it is Posted, or placed in the queue and the time it is Done, or when the VI NIC has completed processing it. The descriptor 23 is a data structure recognizable by the VI NIC that describes a data movement request, and it includes a list of segments, including a control segment, an optional address segment and one or more data segments. The control segment identifies the type of VI NIC data movement operation to be performed, such as, send and receive operations and the status of a completed NIC data movement operation. The data segment describes or provides an address of an application data buffer for a VI NIC data movement operation. A receive queue 19 contains descriptors that describe where to place incoming data. A send queue 21 contains descriptors that describe the data to be transmitted. A pair of VIs can be associated using connection primitives to allow packets sent at one VI to be received at the other VI. A send doorbell 25 and a receive doorbell 27 are provided for allowing the VI consumer to notify the VI N IC 18 that work has been placed in the send queue 19 and receive queue 21, respectively, meaning that a descriptor describing a requested data transfer operation has been placed in queues 19 and 21.

Referring to FIG. 1A again, the VI user agent 14 is a software component that enables an operating system communication facility 12 to use a particular VI provider 24. The VI user agent 14 abstracts the details of the underlying VI NIC hardware in accordance with an interface defined by an operating system communication facility 12. The VI user agent includes a library of primitives that provide functions for creating a VI, for destroying a VI, for connecting one VI to another, to post descriptors, which means that the descriptor is placed in a work queue.

The kernel agent 16 is the privileged part of the operating system, usually a driver supplied by the VI NIC vendor, that performs the setup and resource management functions needed to maintain a virtual interface between VI consumers and VI NICs. These functions include the creation/destruction of VIs, VI connection setup/teardown, interrupt management, management of system memory used by the VI NIC and error handling. VI consumers access the kernel agent 16 using the standard operating system mechanisms such as system calls. As shown by arrow 26 (FIG. 1A), the OS communication facility 12 makes system calls to the VI kernel agent 16 to perform several control operations, including to create a VI on the local system, to connect the local VI to a VI on a remote system (if connection-oriented transfer is desired), and to register application memory. Memory registration enables the VI provider (or VI NIC) to transfer data directly between the registered buffers of a VI consumer and the network (without passing through the OS kernel). Traditional network transports often copy data between user buffers and one or more intermediate kernel buffers. Thus, processing overhead is decreased in the VI architecture because data transfers are performed by the NIC by moving data directly between the registered application buffers and the network without making intermediate kernel copies and without making system calls to the OS kernel.

After creating a VI on the local system of host, connecting the local VI to a remote VI (if a connection oriented data transfer is desired), and registering memory, application 10 or operating system communication facility 12 can use data transfer primitives of VI user agent 14 to send and receive data. The VI architecture defines two types of data transfer operations: 1) traditional send/receive operations; and 2) Remote DMA (RDMA) read/write operations. Once a connection is established (if a connection is desired), the OS communication facility can post the application's send and receive requests directly to the local VI, such as to the send and receive queues. A consumer 8 posts descriptors, or places the descriptors in a work queue then rings a doorbell to notify the NIC that work has been placed in the work queue. The VI NIC 18 then processes the descriptor by sending or receiving data (directly between application memory and network without kernel processing), and may then notify the VI consumer 8 of the completed work using the completion queue 22. VI architecture does not provide for transport level services, including segmentation and reassembly, flow control, buffer management, etc., nor does VI specify many of the details for performing the data transfers.

III. An Example Channel Based Network

FIG. 2 is a block diagram illustrating an example channel based network according to an example embodiment of the present invention. According to an example embodiment, the channel based network 200 allows one or more hosts or other computing devices to communicate with one or more remote fabric attached I/O units. According to an embodiment, the channel based network 200 includes one or more hosts including host 202 and host 220, and one or more input/output (I/O) units including I/O units 240 and 250. The hosts and I/O units are coupled together over a switched fabric 230. The switched fabric 230 includes one or more switches.

According to an embodiment of the invention, the channel based network 200 (FIG. 2) is based upon or similar to the Virtual Interface (VI) Architecture. As such, the channel based network 200 includes many of the features and advantages of the VI architecture. According to an embodiment of the channel based network 200, a pair of work queues, such as a send queue and a receive queue, are preferably provided at each node of the channel based network 200. The work queues allow for direct data transfers between the node's registered memory regions or buffers and the network without system calls to the OS kernel and without making kernel buffer copies, as described above regarding the VI architecture. Memory regions/buffers can include volatile and nonvolatile memory, storage devices, I/O devices, network attached devices, etc.

An I/O unit is a node attached to the switched fabric 230 that services I/O requests, and may have one or more I/O devices attached thereto, for example, including storage devices, network devices, I/O devices, etc. A host is a computer, a server, or other computing device on which a variety of software or programs may run, including an operating system (OS), OS communications facilities, application programs, etc. One or more programs running or executing on a host (such as a device driver or application program) may initiate a request for I/O services, which will be serviced by an I/O node.

Each host or I/O unit includes a channel adapter for interfacing to the switched fabric 230. A channel adapter includes the logic and/or control that allows nodes to communicate with each other over a channel or over the switched fabric 230 within the channel based network 200. Each channel adapter includes one or more ports, with each port typically having a unique address, such as, for example, a unique media access control address or MAC address.

According to an embodiment, there may be two types of channel adapters. A host includes a host channel adapter (HCA) for interfacing the host to the fabric 230, while an I/O unit includes a target channel adapter (TCA) for interfacing the I/O unit to the fabric 230. As shown in FIG. 2, host 202 includes a HCA 210 and host 220 includes a HCA 222. I/O unit 240 includes a TCA 242 while I/O unit 250 includes a TCA 252. Objects 253 and 257 are connected to I/O unit 240 and may also be, for example, a controller an I/O device, a storage device, etc., or other device. Likewise, object 254 is connected to I/O unit 250. Hosts 202 and 220 may access objects 253, 257 and/or 254 over the switched fabric 230 via one of the I/O units.

Each host and I/O unit includes a work queue pair (or a virtual interface) including both a send queue and a receive queue for posting descriptors for the purpose of sending and receiving data, respectively, over the switched fabric 230. For example, host 202 includes a send queue 214 and a receive queue 216 while host 220 includes a send queue 224 and a receive queue 226. Likewise I/O unit 240 includes a send queue 244 and a receive queue 246. I/O unit 250 also includes a send queue and a receive queue, not shown.

FIG. 3 is A block diagram illustrating a block diagram of a hardware configuration of an example host according to an example embodiment. Host 202, as an example host, may include, for example, a processor (or CPU) 204, a memory 206, such as Dynamic Random Access Memory or DRAM, a memory controller 208, a host channel adapter (HCA) 210, a computer display and pointing devices, such as a mouse and keyboard, and other components typically provided as part of a computer or server.

Figure 4:
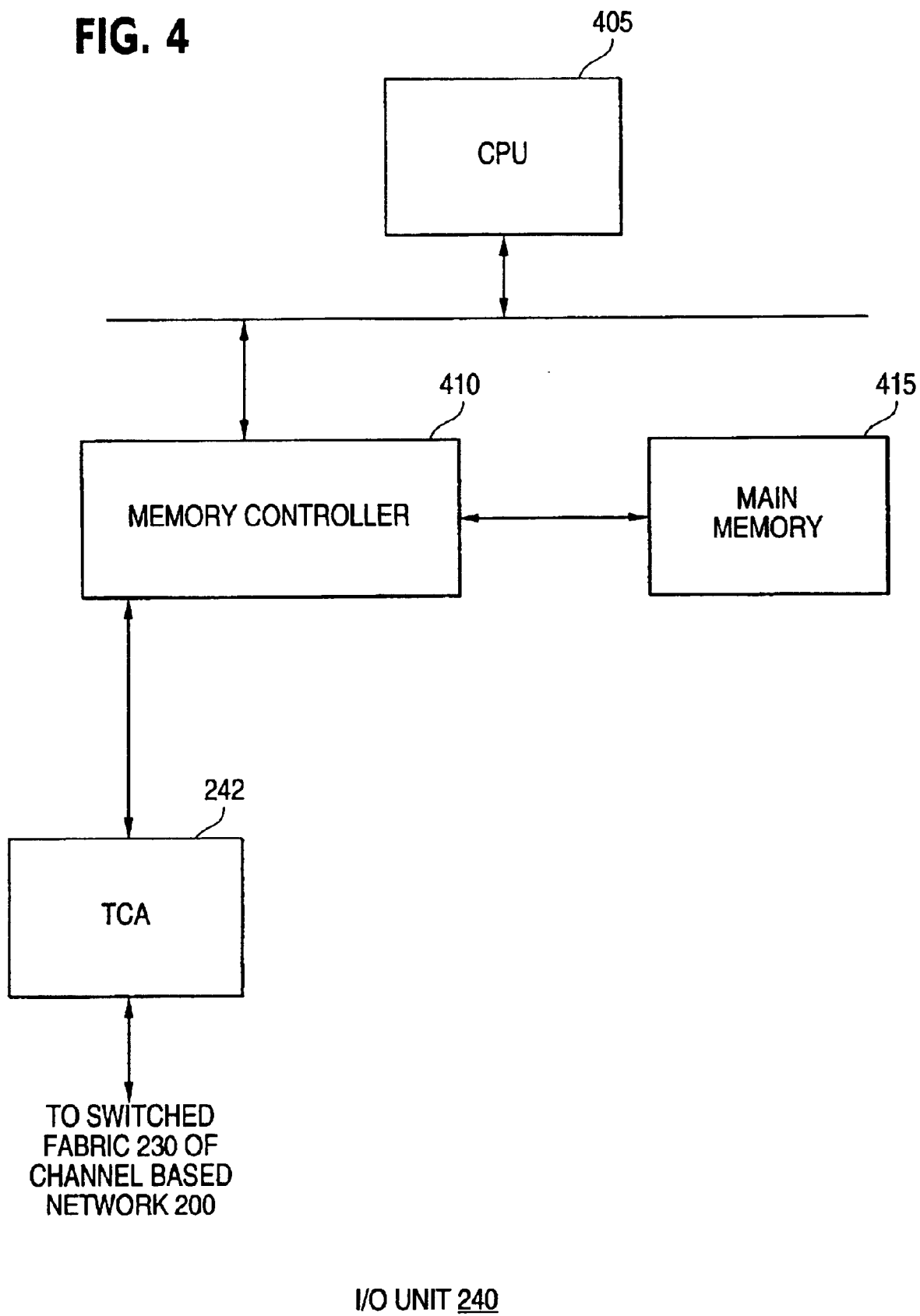
FIG. 4 is a block diagram illustrating an example hardware configuration of an I/O unit according to an example embodiment.

FIG. 4 is a block diagram illustrating an example hardware configuration of an I/O unit according to an example embodiment. The example I/O unit 240 includes a CPU or processor 405, a memory controller 410, a main memory 415 such as DRAM, and a target channel adapter (TCA) 242.

According to an embodiment, one or more applications and other programs, such as application programs, operating system, I/O device drivers, etc., running on a host or an I/O unit may operate as a VI consumer, while each connected channel adapter (i.e., HCA or TCA) may operate as a VI NIC 18 (see FIG. 1A).

According to one embodiment, the term "channel based network" may refer to a network in which data transfers are performed directly between registered buffers or memory regions, for example, registered application buffers and the network without making kernel buffer copies, similar to the VI architecture. An additional copy of the data may also be made at the NIC level or by the channel adapter.

Therefore, according to an embodiment, hosts and I/O units each may include a work queue pair, including a send queue and a receive queue, as described above for VI. These queues may take many different forms. According to an example embodiment, the host node, such as a host application program or host driver places descriptors into send queues for a send operation or into receive queues for a receive operation, and then rings a doorbell to notify the HCA that work has been placed in the work queues. The HCA then sends or receives the data over a channel. For example, for a send operation, the HCA generates one or more packets containing the data from the host's registered buffer(s) described by the descriptor as a payload. The one or more packets are then sent over the channel, for example, over the network 200, including over the switched fabric 230 to the destination node and destination work queue pair.

The behavior of a channel depends on two attributes, the acknowledge and connection attributes. If the acknowledge attribute is set, then a descriptor is not completed until an acknowledgement is returned. If this acknowledge attribute is not set, then the no acknowledgement is sent and the descriptor is completed when the packet is sent onto the wire or transmission media of switched fabric 230. When the connected attribute for a channel is set, meaning for example that the channel is a connected or connection-oriented channel, the two work queue pairs, such as a queue pair at the host and a queue pair at the I/O unit are bound together or associated at either end of the channel. Therefore, all data sent from one send queue is directed to the connected receive queue. If the connected attribute is not set meaning a connectionless data transfer or connectionless channel, then communicating work queue pairs are not bound together, and a node can send/receive packets to/from any work queue pair. In such case, because the two ends of the channel are not bound together, the descriptor that is posted for the data transfer, such as for a Send is typically required to include a field that specifies the destination, such as a MAC address and work queue pair number of the destination.

IV. Example Operation of Automatic Failover in a Channel Based Network

According to an example embodiment of the invention, a technique is provided to allow for continued operation of a circuit switched connection (or channel) in the presence of failures on a local port or on a fabric while requiring little action by the user of the channel.

Figure 5:
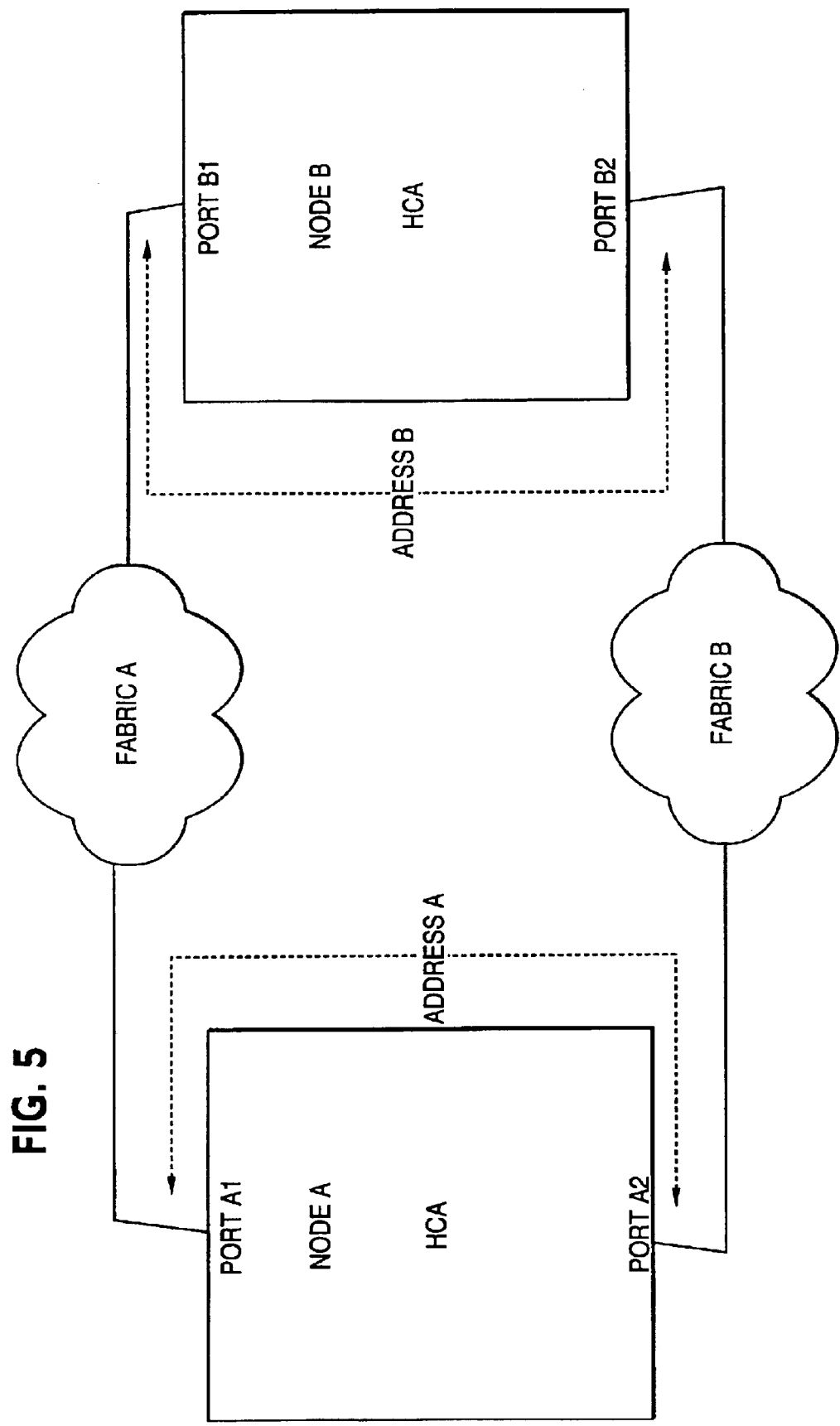
FIG. 5 is a block diagram illustrating a network according to an example embodiment.

FIG. 5 is a block diagram illustrating a network according to an example embodiment. Two nodes are shown, which may be hosts or I/O units for example, including node A and node B. The two nodes are each attached to two fabrics, including fabric A and fabric B. Thus, fabrics A and B may be described as in failover mode because fabrics provide alternate paths or alternate fabrics for node A to communicate with node B. According to an example, embodiment, a channel or connection between two nodes (such as between nodes A and B) can be identified by: <Address1, port1, Address2, port2>, where address1 and port 1 are the address and port number for one end of the channel (e.g., node 1), and address2 and port2 are the address and port number for the other end of the channel, such as for node 2. According to an example embodiment, the channel context on each endpoint of the channel includes: the MAC address and work queue pair number of the remote node and the local port number.

As shown in FIG. 5, each node includes two ports, with each port being connected to a different fabric. For example, port A1 of node A is connected to fabric A while port A2 is connected to fabric B. Node B has a similar arrangement. According to an example embodiment, it may be advantageous if the MAC addresses of two or more ports of a node have the same MAC addresses. For example, as shown in FIG. 5, port A1 and port A2 both are assigned the address A. According to an example operation, node A may have a channel established with node B through local port A1 and fabric A. Node A may receive an alert or interrupt indicating that a failure of port A1 or a failure of fabric A was detected. Node A can then re-establish a channel to node B through an alternate local port and alternate fabric. In this example, node A could establish a channel or connection with node B through local port A2 and fabric B. Note that because both port A1 and port A2 have the same MAC address (address A), the MAC address for node A will not change.

Figure 6:
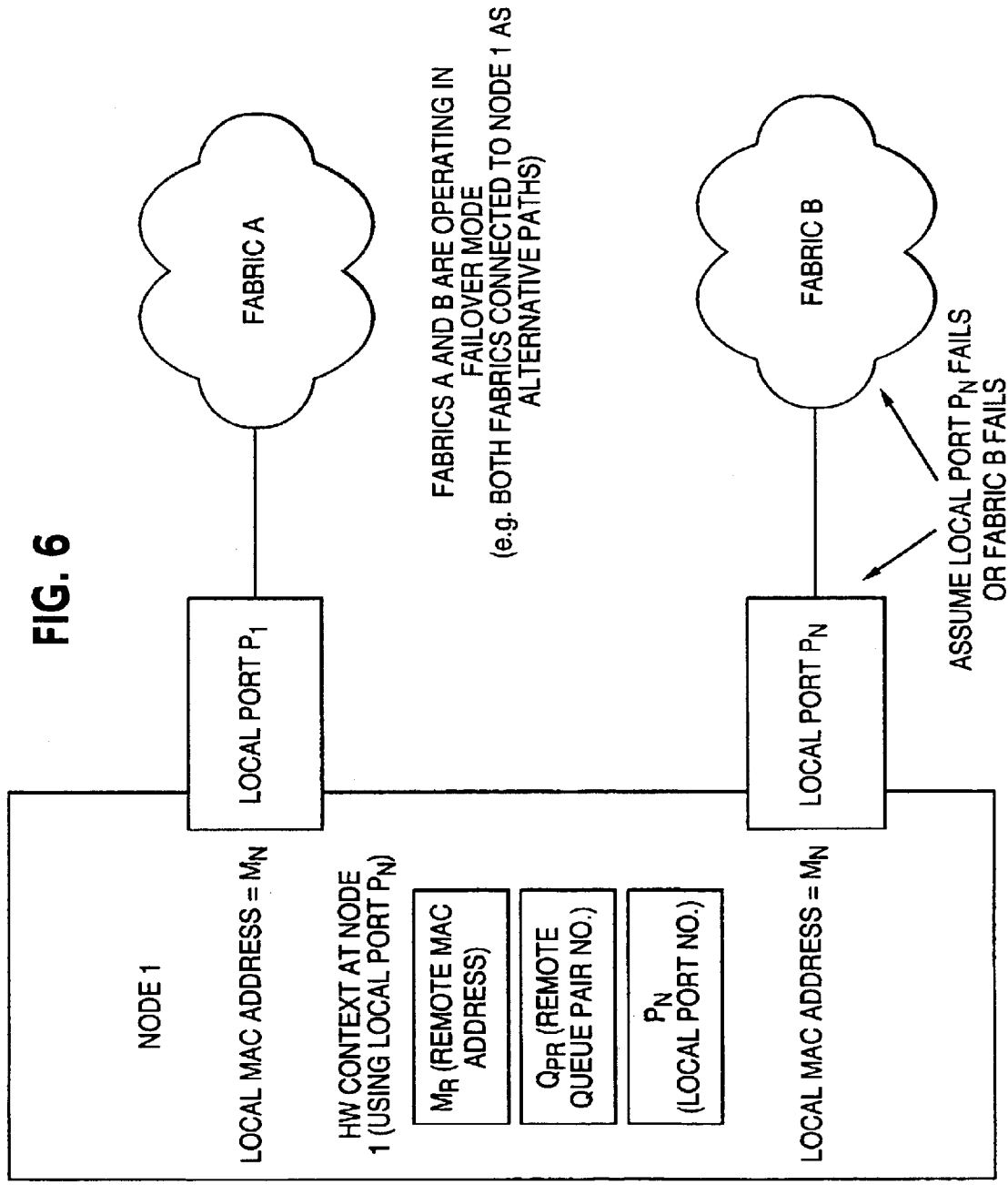
FIG. 6 is a block diagram of a network having two alternate fabrics for failover according to an example embodiment.

FIG. 6 is a block diagram of an example network having two fabrics operating in failover mode according to an example embodiment (e.g., the two fabrics provide alternate communication paths for the node, and thus, the node can switch from one fabric to the other in the event of a fabric failure). In this example, node 1 includes two ports, including local port $P_1$ and local port $P_N$. Node 1 could have any number of ports. Initially, there is a channel or connection established between Node 1 and another node (a remote node) through local port $P_N$ and fabric B (as an example). As shown in FIG. 6, node 1 includes a channel context including: $M_R$ (the MAC address of the remote node), $Q_{PR}$ (the queue pair number of the remote node) and $P_N$ (the local port number). Instead of a remote queue pair number, the channel context could alternatively include the remote port number (port number of the remote node) used for the channel or connection. The remote node maintains a similar channel context, for example, which identifies the MAC address of node 1, the queue pair number used at node 1 for the channel or connection and the local port used at the remote node.

If node 1 detects a failure or error on the local port (port N) or an error or failure with the fabric (fabric B), the user at the node 1 would need to establish a new channel or connection, or re-establish the connection through new fabric/port, including a new context. A shown in FIG. 6, the user program would, for example, change the local port number from $P_N$ to $P_1$, which changes the channel context for node 1. The channel context at the remote node would also typically change because Ports $P_N$ and $P_1$ would typically have different MAC addresses at node 1.

Thus, it can be seen that an entirely new channel or connection having a new context would need to be established even when the fabrics are operating in failover, for example, available as alternate paths. Thus, the user (e.g., kernel or user-level program) would typically need detailed knowledge of the channel or connection, one or more alternate paths, and receive alert of the failure. With respect to VI architecture type of network, to establish a new channel after detection of a failure, the user at the node would need to be aware or multiple paths, and then connect or establish the new channel, resubmitting descriptors, possibly re-registering memory, etc. Moreover, if the node has, say, 10,000 ports connected to fabric B and fabric B fails, node 1 may for example receive 10,000 interrupts indicating communication failure along each of the 10,000 ports. The node or user would then have to establish a new channel along an alternate or different path, for example, through fabric A.

According to an example embodiment, a technique is provided to allow continued operation of a circuit-switched connection or channel in the presence of failures on a local port or on a fabric without requiring action by the user of the channel, and without the requiring the user to maintain information as to the details of the channel, such as queue pair numbers, ports, MAC addresses or being notified of a failure or error with a local port or fabric. This technique is applicable to both privileged (kernel) and non-privileged (user-level) users of channels or connections. The technique is preferably used on nodes, such as hosts, I/O units, etc. which have multiple ports and which are connected to multiple fabrics, where at least some of the ports have (or can have) the same MAC address. As described in detail below, no changes are required to the channel context to achieve failover, such as to switch to a new port and fabric after detection of a port/fabric failure.

FIG. 7 is a diagram illustrating a virtual to physical port map according to an example embodiment. The virtual to physical port map 700 is provided in order to separate the per channel context, including address and port number fields used in cell headers, from the detailed information necessary to perform efficient failover, for example, to establish or re-establish a channel or connection over an alternate path or fabric after detecting a failure. The node or a connection management subsystem of the node assigns a virtual port number ($VP_N$) for the channel. According to an embodiment, the per channel context now advantageously includes the remote MAC address ($M_R$), the remote queue pair number ($QP_R$) and the local virtual port number ($VP_N$).

The virtual port to physical port map 700 identifies a physical port ($PP_N$) for each virtual port ($VP_N$) being used, or identifies a virtual port for each physical port being used for a channel. In this manner, the per channel context for a channel can be established when the channel or connection is initially established. The node, such as the HCA of the node or a port mapper would then assign a physical port ($PP_N$) to the virtual port ($VP_N$) for the channel. The HCA and TCA may also be referred to as a network interface. The virtual to physical port map 700 would identify this mapping between virtual port ($VP_N$) and physical port ($PP_N$). In the event that a failure of the assigned physical port or of the initial fabric, the port mapper of the node (or the HCA or other sub-system or circuit) would simply identify an alternate fabric, identify an available physical port that is connected to the alternate fabric, and then re-map the virtual port for the channel or connection to the new physical port.

Note, that a new connection need not be established using this technique. The per channel context includes the remote MAC address, the remote queue pair and the local virtual port, not the physical port, which remains constant despite a change in the assigned physical port. Thus, according to this particular example embodiment, a change in the virtual to physical port map 700 does not change the channel context. This is because of the separation or independence between the virtual and physical port, and because the new physical port preferably has the same MAC address as the original physical port. Thus, the user, for example, the kernel or user-program, need not know the details of the channel, such as the queue pair, ports, MAC addresses, fabrics, etc., or even be made aware of the failure.

In an example, node 1 has 20 physical ports, with ports 1–10 connected to fabric A, and physical ports 11–20 connected to fabric B. In the event that fabric B fails, the virtual to physical port map can be updated to re-map virtual ports for the existing channels from physical ports corresponding to (or connected to) the failed fabric to physical ports corresponding to (or connected to) the alternate fabric. In other words, if one fabric fails, the virtual to physical port map can be updated to remap the operating virtual ports to physical ports connected to an alternate (working) fabric. Thus, in the example, when fabric B fails, the HCA or port mapper or other circuit, etc. would identify an alternate fabric and the available physical ports of the node connected to the fabric. In this example ports 1–10 are connected to alternate fabric A. The virtual to physical port map 700 would then be reprogrammed or updated to map the virtual ports of the 10 channels to the new physical ports 11–20, which are connected to the operating or new fabric, according to this example embodiment.

Thus, rather than receiving 10,000 failure alerts, such as one from each port, when a fabric failure occurs and then recovering from each channel failure by separately re-establishing a new channel, the present invention allows recovery to be performed for the entire fabric. That is, recovery from a fabric failure is performed on a per fabric basis rather than on a per channel basis. The per fabric recovery may be performed in response to one or more port or channel failure alerts or interrupts or in response to an alert or interrupt that indicates the fabric has failed. In addition, because the channel context does not change during failover, it is not necessary to establish a new channel over the operating (new) fabric. Both nodes can continue to send and receive packets while using the same context in the headers of transmitted packets, such as source and destination MAC addresses, virtual port numbers, queue pair numbers, etc. (only a physical port number has changed). As a result, the present invention permits a faster recovery from a fabric or port failure while greatly decreasing the kernel overhead and processing required to recover from the failure.

Figure 8:
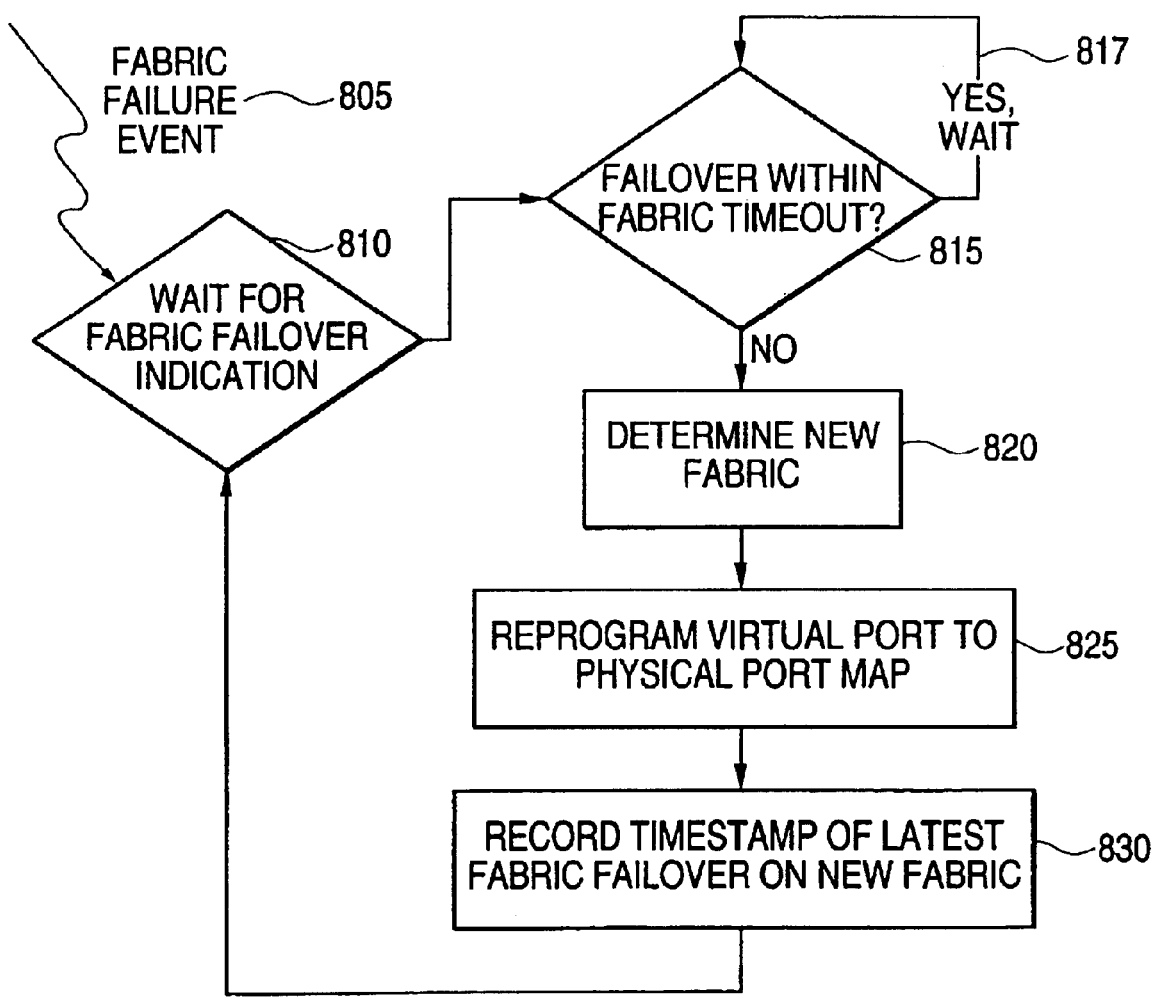
FIG. 8 is an example flowchart illustrating a failover operation according to an example embodiment.

FIG. 8 is an example flowchart illustrating an example failover operation according to an example embodiment. At 810, the system waits for a fabric failover indication. Finally, a fabric failure event 805 is received, indicating that a currently used fabric has failed, and the node should switch to an alternate fabric.

At 815, the node determines if the fabric failure event occurred within a fabric timeout. In other words, the node must determine if this failover (or fabric failure event) occurred within some predetermined time period since the last failover. If the failover or failure event occurred within this time period since the last failure event, then the node waits, 817. This minimum waiting period allows the fabric to drain of all failure event alerts or interrupts and reach a steady state before detecting a separate failure event. This prevents the same fabric failure from triggering more than one failover.

At 820, the node determines a new or alternate fabric that can be used for communication, and also determines the available physical ports connected to this new fabric.

At 825, the node reprograms the virtual to physical port map 700 (FIG. 7) to perform the failover onto the new fabric, such as to effect the switch from the failed fabric to the new fabric.

At 830, the node records a timestamp of this latest fabric failover onto the new fabric. The process then proceeds to 810, to wait for the next fabric failure event, such as a fabric failover indication. This timestamp recorded at 830 will be used at the next occurrence of block 817, and indicates when failover last occurred.

FIG. 9 is a block diagram of a node according to an example embodiment. The node maintains a per channel context 905 for each channel, including the remote MAC address, the remote work queue pair, and the local virtual port number. The context may also include the priority for cells transmitted over the channel. The node also includes a cell construction engine (and scheduler) 915 which receives descriptors and data from block 910 and then assembles cells/packets for transmission. The cells include headers, for example, that include the per channel context, such as MAC address, work queue pair numbers, virtual port number, priority, etc. The cells to be transmitted are placed in priority queues 920. When a cell is ready to be transmitted, a port mapper 925 uses the virtual to physical port map 700 to map the local virtual port to the local physical port. The cell scheduler 930 then schedules the transmission of the cell from the identified physical port over the fabric.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method comprising: establishing a channel or connection over a channel based network from a first physical port, the first physical port being mapped to a first virtual port; identifying a second physical port; and remapping the virtual port to the second physical port to move the connection to the second physical port.

2. The method of claim 1 wherein establishing comprises establishing a channel or connection from a first physical port over a first fabric, the first physical port being mapped to a first virtual port.

3. The method of claim 2 wherein identifying comprises identifying a second fabric and a second physical port connected thereto.

4. The method of claim 3 wherein the remapping comprises remapping the virtual port to the second physical port to failover onto the second fabric.

5. The method of claim 4 wherein the remapping comprises remapping the virtual port to the second physical port to failover onto the second fabric without re-establishing the channel or connection.

6. A method comprising: establishing a channel over a channel based network between a local node and a remote node through a first physical port at the local node and through a first fabric, the channel being assigned to a local virtual port; providing a virtual to physical port map; detecting a fabric or port failure; identifying a new fabric and a new local physical port that is connected to the new fabric; and reprogramming the virtual to physical port map to reassign the virtual port to the new local physical port.

7. The method of claim 6 wherein the local node maintains a local per channel context including an address of the remote node and the local virtual port.

8. The method of claim 7 wherein the local per channel context further includes a queue pair number of the remote node.

9. The method of claim 6 and further comprising: determining if the fabric failure occurred within a predetermined time period of a last fabric failure; and reprogramming the virtual to physical port map only if the fabric failure did not occur within the predetermined time period of a last fabric failure.

10. The method of claim 6 wherein the same address is assigned to both the first physical port and the new physical port.

11. A method comprising: establishing a plurality of channels or connections over a channel based network from a first group of physical ports over a first fabric, the first group of physical ports being mapped to a group of virtual ports; detecting a failure of the first fabric; identifying a second fabric and a second group of physical ports connected thereto; and remapping the group of virtual ports to the second group of physical ports to failover onto the second fabric.

12. The method of claim 11 wherein the remapping comprises remapping the group of virtual ports to the second group of physical ports to route the plurality of channels through the second fabric rather than the first fabric.

13. An apparatus comprising a storage readable media having instructions stored thereon, the instructions resulting in the following when executed by a machine: establishing a channel or connection over a channel based network from a first physical port over a first fabric, the first physical port being mapped to a first virtual port; detecting a failure; identifying a second fabric and a second physical port connected thereto; and remapping the virtual port to the second physical port.

14. The apparatus of claim 13, wherein the establishing comprises establishing a channel or connection from a physical first port over a first fabric, the first physical port being mapped to a first virtual port, and wherein the identifying comprises identifying a second fabric and a second physical port connected thereto.

15. An apparatus comprising: a virtual to physical port map; a node comprising a plurality of physical ports and coupled to a plurality of fabrics, the node to establish a channel or connection over a channel based network over a first physical port and a first fabric, the first physical port being mapped to a virtual port, the node to identify a second fabric and a second physical port connected thereto in response to a fabric failure, the node comprising: a port mapper coupled to the virtual to physical port map to map the virtual port to the second physical port to failover onto the second fabric.

16. The apparatus of claim 15 and wherein the node further comprises a cell scheduler coupled to the first and second physical ports.

17. The apparatus of claim 15 wherein the node further comprises a cell construction engine.

18. The apparatus of claim 15 wherein the port mapper comprises a port mapper to map the virtual port to the second physical port to route the channel through the second fabric rather than the first fabric.

19. A node comprising: a plurality of physical ports; a network interface to establish a connection over a channel based network to a second node via a first physical port; a virtual-to-physical port map to maintain a map or correspondence between the first physical port to a first virtual port, the context of the connection defined in part by the first virtual port; and a port mapper coupled to the virtual-to-physical port map to re-map the first virtual port to a second physical port if a failure is detected.

20. The node of claim 19 wherein the first physical port is coupled to the second node via a first fabric while the second physical port is coupled to the second node via a second fabric, and the port mapper to re-map the first virtual port from the first physical port to the second physical port if a failure in the first physical port or first fabric is detected.

21. The node of claim 19 wherein the network interface comprises a channel adapter.

22. The node of claim 21 wherein the channel adapter comprises a host channel adapter.

23. The node of claim 19 wherein the node further comprises one or more work queues.

24. The node of claim 23 wherein the one or more work queues comprise a send queue and a receive queue.

25. The node of claim 24 wherein the node comprises a send queue and receive queue for each channel or connection.

26. The node of claim 19 wherein the node comprises a central processing unit, memory and a memory controller.

27. The node of claim 19 wherein the port mapper comprises a port mapper to re-map the first virtual port from the first physical port to the second physical port if a failure in the first physical port or first fabric is detected, the context of the channel, including the first virtual port, remaining the same despite the remapping from the first physical port to the second physical port.

28. A first node comprising: a plurality of physical ports and a plurality of virtual ports; a network interface having a first physical port coupled to a first fabric and a second physical port coupled to a second fabric; a virtual-to-physical port map to maintain a map or correspondence between physical ports and virtual ports; a port mapper to update the virtual to physical port map to map a new physical port to a virtual port; the network interface to establish a connection over a channel based network over the first fabric and first physical port to a second node, the first virtual port being mapped to the first physical port in the port map, the connection being defined at least in part by the first virtual port; and the port mapper to update the virtual to physical port map to map the first virtual port to the second physical port to provide the connection over the second port and second fabric in the event of a failure or problem with either the first physical port or the first fabric.

29. The node of claim 28 wherein the network interface comprises a channel adapter.

30. The node of claim 28 and further comprising one or more work queues.

31. A system comprising: a first node comprising: a plurality of physical ports and a plurality of virtual ports; a network interface having a first physical port coupled to a first fabric and a second physical port coupled to a second fabric; a virtual-to-physical port map to maintain a map or correspondence between physical ports and virtual ports; a port mapper to update the virtual to physical port map to map a new physical port to a virtual port in the event of a failure; a first fabric coupled to the first physical port of the first node; a second node coupled to the second physical port of the second node; the network interface to establish a connection over a channel based network with a second node over the first fabric and first physical port, the first virtual port being mapped to the first physical port in the port map, the connection being defined at least in part by the first virtual port; and the port mapper updating the virtual to physical port map to map the first virtual port to the second physical port in the event that a failure in either the first physical port or the first fabric is detected.

32. The system of claim 31 wherein the port mapper comprises a port mapper to update the virtual to physical port map to map the first virtual port to the second physical port to provide the connection over the second port and second fabric in the event of a failure or problem with either the first physical port or the first fabric.

33. The system of claim 31 wherein the network interface comprises a channel adapter.

* * * * *